July 10, 1956 H. JUNGHANS 2,754,377

DEVICE FOR PREVENTION OF OVERHEARING OF TELEPHONE CONVERSATIONS

Filed Sept. 16, 1952 6 Sheets-Sheet 1

INVENTOR
HELMUT JUNGHANS
BY Haseltine, Lake & Co
AGENTS

July 10, 1956 H. JUNGHANS 2,754,377

DEVICE FOR PREVENTION OF OVERHEARING OF TELEPHONE CONVERSATIONS

Filed Sept. 16, 1952 6 Sheets-Sheet 2

INVENTOR
HELMUT JUNGHANS
BY Haseltine, Lake & Co.
AGENTS

July 10, 1956 H. JUNGHANS 2,754,377

DEVICE FOR PREVENTION OF OVERHEARING OF TELEPHONE CONVERSATIONS

Filed Sept. 16, 1952 6 Sheets-Sheet 3

INVENTOR
HELMUT JUNGHANS
BY
Haseltine, Lake & Co.
AGENTS

DEVICE FOR PREVENTION OF OVERHEARING OF TELEPHONE CONVERSATIONS

Filed Sept. 16, 1952 6 Sheets-Sheet 4

INVENTOR
HELMUT JUNGHANS
BY Haseltine, Lake & Co.
AGENTS

July 10, 1956 H. JUNGHANS 2,754,377

DEVICE FOR PREVENTION OF OVERHEARING OF TELEPHONE CONVERSATIONS

Filed Sept. 16, 1952 6 Sheets-Sheet 5

INVENTOR
HELMUT JUNGHANS
BY Haseltine, Lake & Co.
AGENTS

DEVICE FOR PREVENTION OF OVERHEARING OF TELEPHONE CONVERSATIONS

INVENTOR
HELMUT JUNGHANS
BY Haseltine, Lake & Co.
AGENTS

United States Patent Office 2,754,377

Patented July 10, 1956

2,754,377

DEVICE FOR PREVENTION OF OVERHEARING OF TELEPHONE CONVERSATIONS

Helmut Junghans, Schramberg-Sulgen, Wurttemberg, Germany

Application September 16, 1952, Serial No. 309,848

Claims priority, application Germany September 17, 1951

31 Claims. (Cl. 179—188)

The present invention relates to phone systems to be used with telephone apparatus for the prevention of overhearing of telephone conversations. Notwithstanding the necessity of conducting telephone conversations with the speaker undisturbed and without his disturbing other persons, as, for example, in offices or other rooms occupied by several persons, known devices have not been accepted by the public. One reason for this is that the known devices did not comply with hygienic requirements as would be necessary for any device to be brought into immediate contact with the face. Further, they proved to be unwieldy and unsufficient as to acoustic requirements.

The present invention provides a device complying with all acoustic as well as hygienic requirements and which prevents telephone conversations from being understood by persons present in the same room as the speaker. This device is easily handled and enables the phone to be manipulated with usual ease. In addition, provision is made for preventing moisture of the speaker's breath or bacteria from penetrating the microphone, both being intercepted at points which are easily cleaned and made sterile.

According to the present invention, a device complying with the above mentioned requirements is characterized in that a respiration valve is inserted into the microphone. Preferably, an expiration valve is also provided. Thin plates or laminations constitute the valve elements and are easily cleaned and replaced. As a muffling device and for the purpose of absorbing moisture of the speaker's breath and a penetrating into the microphone, a conveniently formed filter may be provided behind the expiration valve, preferably in such a manner as to keep the filter space easily accessible from without for the purpose of replacing the filter element. For preventing the moisture of the speaker's breath from penetrating into the microphone, the speaking tube is preferably cup-shaped, i. e. its sides and bottom being closed with that part of the wall or shell facing the microphone having an opening provided with a diaphragm. The diaphragm may be made of thin, light laminated plastics and may be protected from the penetrating moisture of the breath by a suitable coating. Suitably the diaphragm is fixed in a detachable annular frame, in order that it may be easily replaced. The mouthpiece may be detachable from the cup-shaped part of the speaking tube connected with it, either for cleaning purposes or for its replacement by a wider or narrower mouthpiece according to the form of the mouth. For telephone devices to be used by several persons, hygienic inserts made of sound-permeable materials such as pulp or streaked gauze, may be inserted into the speaking tube or bell and readily replaced after use.

There are various embodiments of the present invention. Thus an auxiliary device may be put on the speaking piece of the usual phone. In such an embodiment the speaking piece is arranged on a cup-shaped insert telescoping in a guide acoustically connected with the microphone. This guide is formed as a knee to be put on the speaking piece at the phone handle together with a sleeve-shaped connection piece made of rubber, the sleeve edges being formed in such a manner as to provide for a sound-tight connection. In addition, the sleeve is preferably so formed as to automatically adjust the mouthpiece to a given position of the phone handle. The bottom of the insert connected with the mouthpiece, in this embodiment, is inclined towards the connecting end of the knee, the cup wall having an opening in front of which the above mentioned diaphragm is arranged in a transversal wall of the knee to prevent the moisture of the speaker's breath from penetrating into the microphone.

In another embodiment of the device according to the invention, the speaking piece and the microphone are combined to form an independent whole arranged on the phone handle through a linked connection, which is adjustable by the hand holding the phone with regard to the distance and the angular position relatively to the receiver or head phone.

In order to bring the speaking piece to the mouth of the user, an isosceles toggle may be provided, one arm of which, while being operated by the user's hand holding the phone, travels like the other arm holding the speaking piece. For reducing the travel of the handle and for quickly bringing the speaking piece to the mouth and putting it down again, transmission agents may be provided for the lifting device, said means extending the travel of the hand in lifting, as compared with its travel when seizing the phone.

According to another embodiment of the invention, a straight course guide system for holding the speaking piece may be provided, one guide together with the operating handle forming a lever transmission. According to another embodiment of the invention, a progressive switch-gear comprising a retracting spring and a releasable trip gear may be provided for the speaking piece, a lever transmission being placed between the actuating handle and the switch member.

For adapting the device to different head forms according to the invention, the speaking piece may be suspended on supports permitting of a lateral displacement towards the phone handle or away from it against the action of a retracting spring. Furtherfore, the head phone may be hinged to the phone handle under the action of a retracting spring.

The speaking piece can be formed as a cup-shaped and exchangeable insert, the edges of which form the speaking conch or shell and the periphery of which is provided with openings to the valves arranged at the insert casing and the bottom of which is formed by the protecting diaphragm.

In a preferred embodiment of the invention, the diaphragm is inserted in the bottom of the insert cup, preferably resiliently forced in. Preferably the insert cup is made of a transparent material, suitably of unbreakable plastic to permit better hygienic control.

Further features and advantages of the invention will be seen in the following specification and the accompanying drawings, wherein Fig. 1 shows, in side elevation an auxiliary device in accordance with an embodiment of the invention, in section and arranged in operative position on a phone of usual type;

Figures 1, 2:
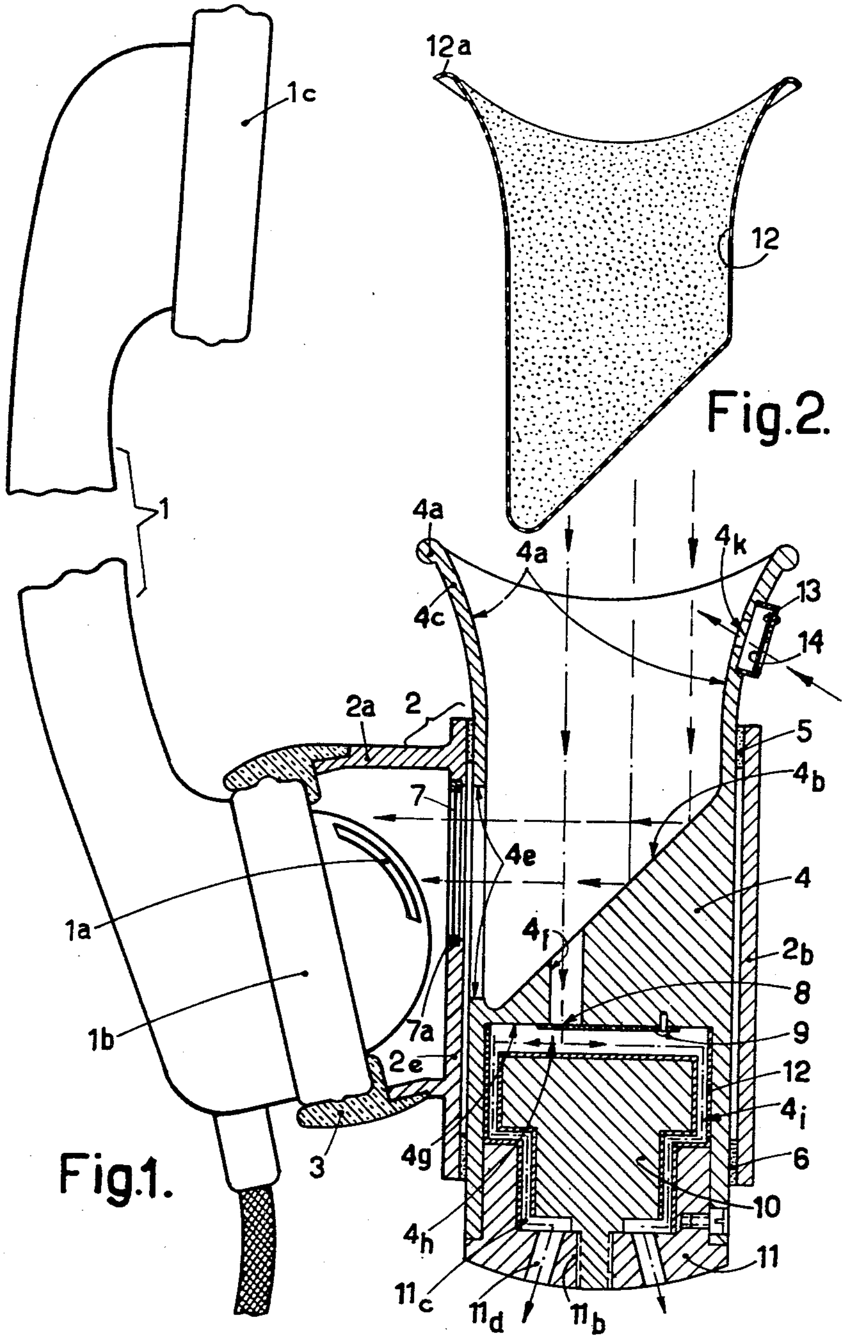
Fig. 2 shows a insert cup, for the device of Fig. 1, in side elevation and in section.

Referring now to the embodiment illustrated by Figures 1 and 2, 1 designates a telephone receiver or phone of usual type; 1a is the speaking piece with sound-holes, 1b indicates the casing of the microphone and 1c is the earpiece. Overlapping and inclosing in a sound-tight manner the piece 1a, the casing 2, hereafter called "knee-piece," is put on the casing 1b of the microphone. The rubber sleeve 3 serves as a sound-tight connection or joint between the fitting 2a directed towards the piece 1a and the casing 1b of the microphone; its elasticity permits of a certain self-adjustment of the knee-piece according to the position of the phone and the head form of the speaker; further details will be described hereinafter.

Transversely to the pipe joint 2a of the knee-piece 2 extends the cylindrical piece 2b serving as a guide for a cup-shaped, cylindrical body 4, felt rings 5 and 6 being inserted between both parts. The cup-shaped body 4 comprises a further cup-shaped body 4a, the bottom 4b of which is inclined towards the pipe connection 2a and the top of which is enlarged to form the shell of the mouthpiece 4c whose edge is so formed as to surround and enclose the mouth of the speaker. In 4e the wall of the cup-shaped speaking bell 4a is broken through and facing this opening 4e is the diaphragm 7 being put into a frame 7a. The frame 7a is inserted into a corresponding aperture of the transversal wall 2e separating both members 2a and 2b. The diaphragm 7, being made of a thin, light, sound-permeable material, such as plastic foils, is intended to prevent the moisture of the speaker's breath and bacteria from penetrating through the mouthpiece 4a of the device into the piece 1a at the phone handle 1. The diaphragm 7 has a protective lining or is itself made of moisture-tight material. The inclined bottom 4b of the cup-shaped mouthpiece is intended for diverting the sound waves in the direction of the diaphragm 7.

In order to evacuate the air expired in speaking, which is of particular importance for speaking distinctly, a borehole 4f extends from the bottom 4b of the mouthpiece to the expiration valve 8. The valve 8 comprises a thin disc e. g. of a thin, elastic and moisture-tight plastic material, said disc or thin plate being secured to the bottom 4g of the groove 4h of the body 4, as shown at 9 of Fig. 1. At 11b a sound filter cartridge 10 is screwed into the plug 11 closing the hole 4h. The cartridge 10 is intended for preventing the sound from finding its way outwards from the mouthpiece 4a through the expiration valve (df, 8); to this end it is made of a damping material, such as glass wool. The expiration channels 4i and 11c surrounding the cartridge 10 similar to a labyrinth, have sound-damping linings 12. The exhaled air finds its way outwards through boreholes 11d in the plug 11.

In order to enable the speaker to breathe, while speaking, without removing the mouthpiece from the mouth, the respiration valve 13, being accessible through the borehole 4k, is arranged on one side of the mouthpiece, comprising the thin valve plate 14 similar to 9.

The device is used in such a manner as to cause the cup-shaped body 4 to telescope within the pipe joint 2b of the knee-piece 2, in order to bring the earpiece 1c as close as possible to the ear, the edges 4d of the mouthpiece tightly enclosing the mouth. The rubber sleeve 3 at the pipe joint 2a of the knee-piece, which may be elongated, permits of a certain angular self-adjustment of the mouthpiece 4c in the main plane of the phone 1 (the plane of the drawing) and in a vertical plane. In speaking, the sound-waves reflected on the bottom 4b of the cup-shaped mouth-piece penetrate through the diaphragm 7 into the piece 1a of the phone 1. The exhaled air is conducted through the borehole 4f and the expiration valve 8, 9 into the filter chamber 4h and from there through the channels 4i, 11c and 11d outwards. The sound-waves will be damped by the sound filter 10 to such a degree that any other persons will not be able to understand the spoken words.

Fig. 2 illustrates a cup-shaped protective insert 12, preferably made of pulp similar to the conical diaphragm for loudspeakers. The edge 12a of said insert overlaps the edge 4d of the mouthpiece, thus tightly enclosing the mouth of the speaker. The protective insert is impregnated with any bactericidal material and can be thrown away after a conversation. The protective insert will be employed in telephone apparatus used by several persons.

Figures 3, 4, 5:
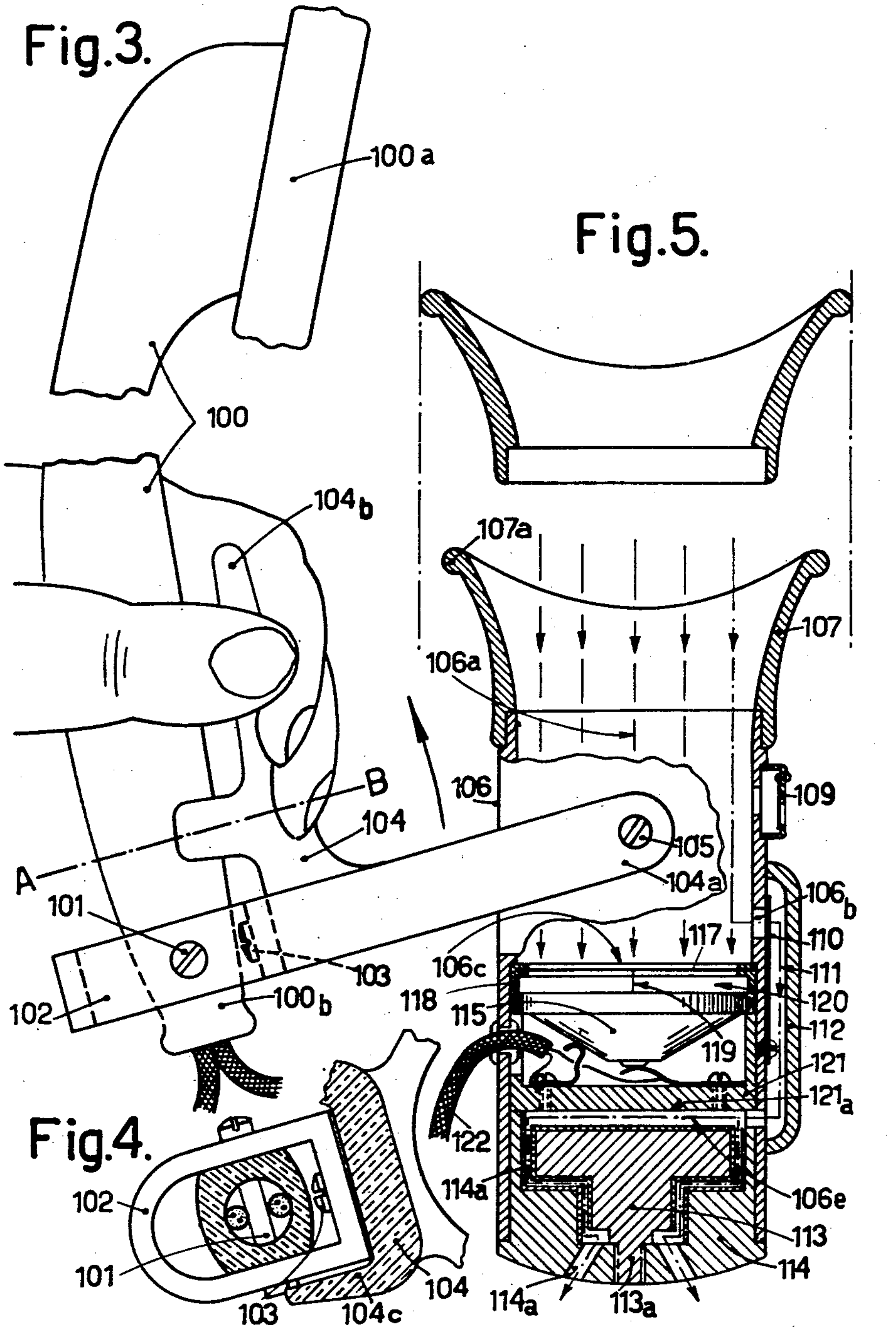
Fig. 3 shows in side elevation and in section an embodiment of the invention in combination with a phone handle carrying only a head phone.
Fig. 4 is a sectional plan view of the cross link connecting the phone handle with the speaking piece and the microphone.
Fig. 5 shows in side elevation a section of an enlarged mouthpiece.

In the second embodiment illustrated by Figures 3 to 5, the microphone is separated from the phone handle and combined with the device of the invention. 100 designates a phone handle, 100a the earpiece. The lower end 100b of the phone handle bears, angularly movable about the axle 101, a ring 102 enclosing the phone handle. Pivotally mounted on the ring 102 is the toggle 104 rotatable about the axle 103. The ring 102 with the axles 101 and 103 combines the phone handle and the toggle 104 to form a cross linkage system, i. e. the toggle 104 is angularly movable in the plane designated as the main plane of the phone handle, coinciding with the drawing plane and dividing the phone handle into two symmetric halves, while said toggle may also be tilted out from the drawing plane and into the drawing plane.

The toggle 104 bears a forked arm 104a and a supporting arm 104b. Swingingly supported in the arm 104b and turning about the axle 105 is the substantially cylindrical casing 106. This casing comprises a cup-shaped member 106a, to the top of which the mouthpiece 107 is joined. Said mouthpiece has tightly closing edges 107a similar to those in Fig. 1; it is detachably secured to the member 106a hereinafter called the mouthpiece, and may be replaced e. g. by the mouthpiece 108 illustrated in Fig. 5 and adapted to larger mouth forms.

Similarly to the above described embodiments, a respiration valve 109 and an expiration valve 110 are arranged at the mouthpiece 106a. The expiration valve 110, however, is arranged laterally on the casing 106 and is accessible through the borehole 106b. The exhaled air will be conducted from the valve through the channel 111 within the attached channel piece 112 to the filter chamber 106c provided at the lower end of the casing 106. Again a filter cartridge 113 is inserted into the filter chamber and into the closing plug 114 at 113a; 114a designates the exhaust channels in the plug.

The microphone 115 is arranged beneath the bottom aperture 106c of the mouthpiece 106a. Above the microphone diaphragm 116, occupying the whole width of the aperture 106c, the protective diaphragm 117 is arranged and fixed within the frame 118. Both diaphragms 116, 117 are connected by the stud 119. The parallel arrangement of the diaphragm 117 overlying the diaphragm 116, both having large surfaces and enclosing the hermetically tight air chamber 120, and the connection of both members by means of the stud 119 favourably influences the sound transmission with regard to the response and the clearness of the sounds.

The protective diaphragm 117 with its frame 118 is introduced from below into the casing 106 and joins the flange **106*d***.

The lower end of the diaphragm frame 118 bears the microphone 115 supported in 121, the bottom **121*a* of the support 121 covering the filter chamber 106*c*. The support of the microphone in its turn is held by the plug 114. 122** designates the cord of the microphone.

The operation of the device is as follows:

In contradistinction to the operation of a normal phone, the fingers of the hand seizing the phone 100 are laid on the surface **100*c* and on the arm 104*b*, as shown in Fig. 3. The mouthpiece 107 is brought to the mouth tightly enclosing it. The earpiece 100*a* is brought to the ear, and by releasing or stressing the lever arm 104*b* the definite position of the mouthpiece 107 and the earpiece 100*a* is adjusted relatively to the head of the speaker, i. e. the mouthpiece and the earpiece lie close to the head in a sound-tight and convenient manner. Due to the arrangement of the cross linkage system 101, 102, 103 and the casing 106 swingingly supported in the forked arm 104*a*, the mouthpiece 107 may be adjusted relatively to the earpiece in any form. For limiting the lateral tilting movement of the casing 106 with the toggle 104 about the axle 103, noses 104*c* are provided on the lever arm 104*b*, abutting on the phone handle 100**.

A phone provided with a device according to the invention may be arranged as an auxiliary device with the required connections on any telephone apparatus, the speaker thus being enabled to use the one or the other phone, according to whether he is alone or other persons are present in the room.

The mouthpiece as well as the other parts of the casing are preferably made of transparent plastics for easily controlling the cleanliness of their surfaces.

Figure 6:
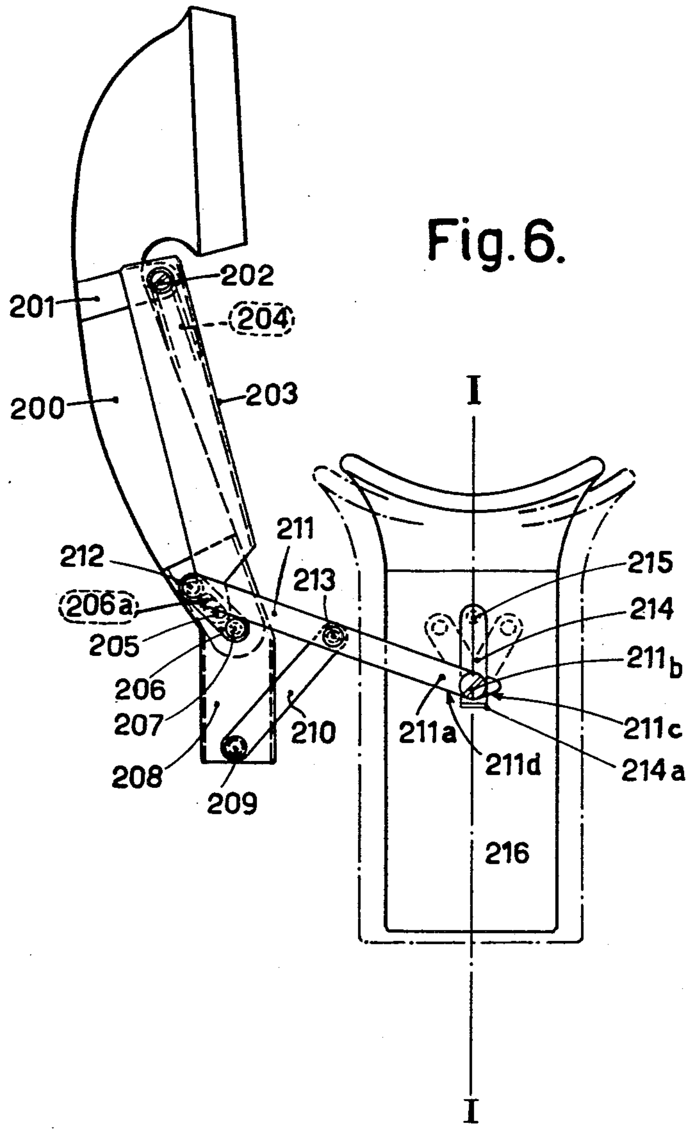
Fig. 6 is a side elevation of an embodiment of the lifting device using a straight course guide system, the speaking piece being lifted.
Figures 7, 8, 9, 10:
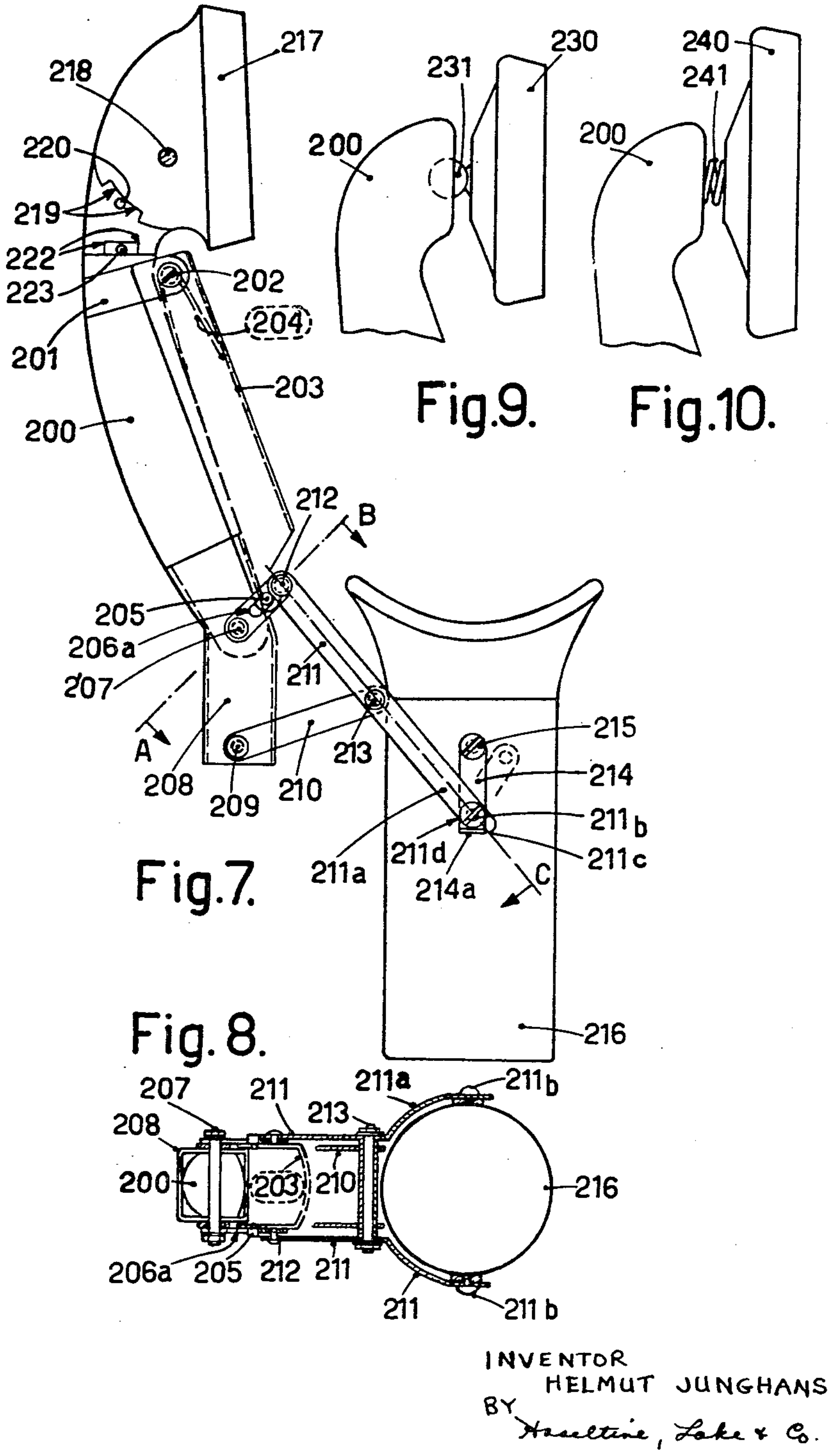
Fig. 7 shows the device of Fig. 6 with a lowered speaking piece, the head phone or earpiece being movable on the phone handle.
Fig. 8 is a section on line A—B—C of Fig. 7.
Fig. 9 shows a further embodiment for a movable earpiece.
Fig. 10 is another embodiment for a movable earpiece.

In the embodiment illustrated by the Figures 6 to 8, a shackle 201 is secured to the phone handle 200, while the latch lever 203 is swingingly supported by a pivot screw 202. The spring 204 retracts the latch lever 203 from the phone handle 200. The forked latch lever 203 engaging the phone handle 200 bears at its end pins 205 by means of which it engages slots **206*a* of guides 206 which are linked in 207, on both sides of the phone handle, to an extension 208 of said handle. Similarly linked to the extension 208 in 209 is the guide 210. The pair of guides 206 and 210 are the basic guides of a straight course guide system also comprising the bar 211. The point at which the guide rod 206 is linked to the bar 211 is designated as 212, while the point at which the guide rod 210 is linked to the bar 211 is designated as 213. The bar 211 is extended by the portion 211*a* beyond the point 213, and the point 211*b* is the point traveling on the straight line I—I. At the point 211*b* the upright support 214 is linked to the bar 211, bearing at its top end the journal 215 for the mouthpiece 216. At its lower end the support 214 is bent outward as 214*a* to form an abutment cooperating with the edge 211*c* and 211*d* of the extension 211*a* of the bar 211, accordingly as the mouthpiece is displaced laterally (in Fig. 6 in the drawing plane). A retracting spring (not shown) is provided between the bar 211 and the support 214, in order to cause the mouthpiece to return to its initial position so that the support 214 stands upright as (shown in full lines in Fig. 6). The double arrangement of the straight course guide rods 206 to 215 is shown in Fig. 8. Comparing the Figures 6 and 7, it will be seen that, for lifting the mouthpiece, a comparatively short travel of the latch lever 203** will be required. Trials made with the device according to the drawing have shown that a lift of 35 mm. is obtained when the latch makes a travel of 8°.

As will be seen in Fig. 7, the earpiece 217 is pivotally supported by 218, its angular movement being limited by abutments 219, 220. A further hinge point for any movements of the earpiece from within the drawing plane (Fig. 7) is provided by pivotally supporting the neck-piece 221 of the earpiece on the phone handle 200, abutments 222 and 223 limiting this movement.

Further examples of movably supporting the earpiece on the phone handle are shown in Figures 9 and 10. In the embodiment according to Fig. 4, a universal joint 231 is provided between the phone handle 200 and the earpiece 230, while in the embodiment according to Fig. 10 a spring 241 is provided between the phone handle 200 and the earpiece 240.

Figures 11, 12, 13:
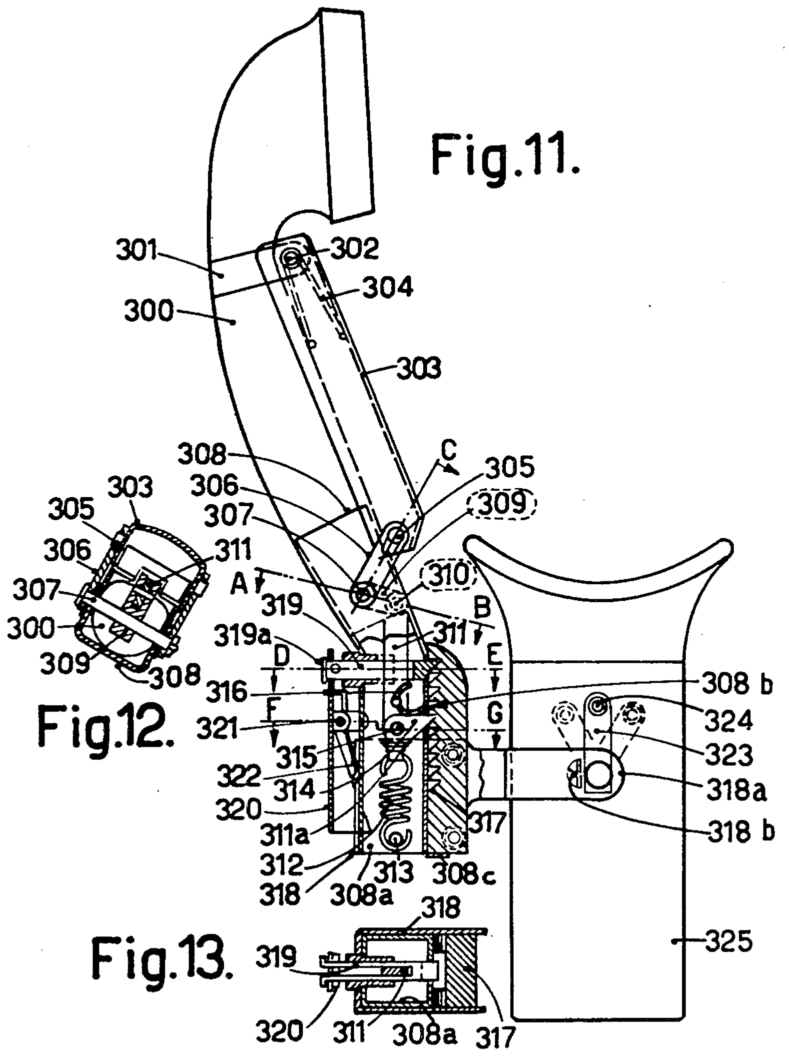
Fig. 11 shows, in side elevation, a second embodiment of a lifting device for the speaking piece, a progressive switchgear being used.
Fig. 12 is a section on line A—B—C of Fig. 11.
Fig. 13 is a section on line D—E of Fig. 11.

In the second embodiment of a lifting device as illustrated by the Figures 11 to 14, 300 designates the phone handle bearing a shackle 301 with the pivot 302 about which the latch lever 303 is pivotally supported. 304 designates a latch spring tending to retract the lever from the handle 300. The U-section of the latch lever is shown in Fig. 12; the lever overlaps the phone handle laterally and bears at its free end hinge fittings 305 for hinging the intermediate lever 306 the other end of which is connected with the shaft 307. The shaft 307 extends through the tubular extension 308 of the phone handle, the latter having supported in it both ends of the shaft. Enclosed by the extension 308 and connected with the shaft 307 is the lever 309 hinged to the bar 311 by means of the pin 310. The lower end of the control bar 311 bears suspended on it in **311*a* the retracting spring 312, the other end of which is secured to the pin 313 extending through the straight portion 308*a* of the extension 308** of the handle.

The control bar 311 bears the latch lever 314 movably supported about the pin 315 and being under the influence of the latch spring 316 pressing it against the end **311*a* of the control bar, said end being bent up to form an abutment. The nose of the latch lever 314 extends through a slot 308*b* in the extension 308*a* of the handle to cooperate with a rack 317 secured to a casing 318 surrounding the extension of the casing 308*a*** and abutting on it.

Figure 14:
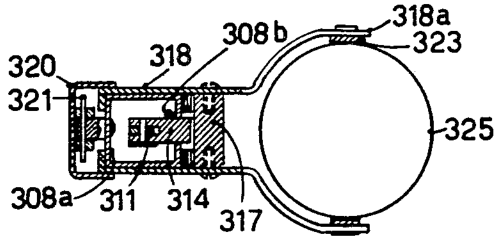
Fig. 14 is a section on line F—G in Fig. 11.

With the rack 317 cooperates the locking bolt 319 being transversally movable in the extension **308*a* of the handle and being forked (as shown in Fig. 13) for accommodating the control bar 311. The head 319*a* of the locking bolt is engaged by the spring latch 320 pivotally supported in 321 at the extension 308*a* of the handle, as shown in Fig. 14. 322** designates the latch spring.

The casing 318 abutting on the extension **308*a* of the handle and containing the rack 317 is provided with two forked arms 318*a*, to the ends of which the upright supports 323 are hinged, the latter bearing the mouthpiece 325 between pins 324. 318*b* designates an abutment at the fork 318*a* limiting the inclined position of the support 323** in both directions of the tilting movement. A spring (not shown) is intended for retracting the support to the upright position (shown in full lines in Fig. 11).

The device is operated in such a manner that with a lowered mouthpiece the hand holding the phone depresses the latch lever several times for preventing others from listening to telephone conversations. Every time the rack 317 together with the casing 318 and the mouthpiece 325 connected with it are lifted against the action of the retracting spring 312, the trip gear 319 blocks the return movement. Due to the arrangement of the lever transmission 303, 306, 309, the travel of the hand at the latch lever is short, the mouthpiece 325 thus easily and quickly being brought into its operative position.

Figure 16:
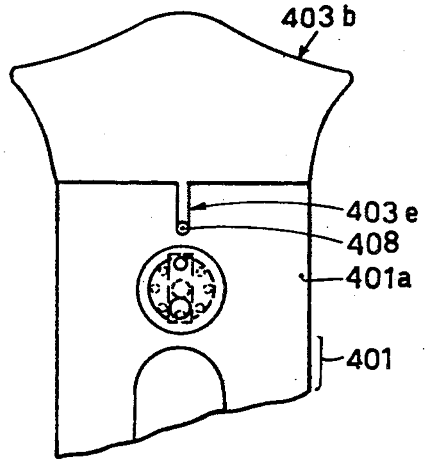
Fig. 16 is a detail of Fig. 15.
Figure 15:
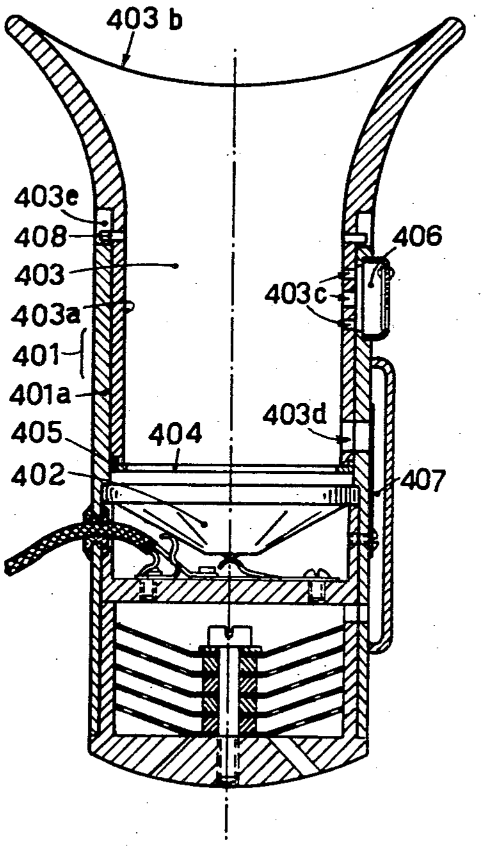
Fig. 15 shows a longitudinal section of a cup-shaped insert.

After concluding a conversation, the spring loaded latch 320 is actuated, simultaneously releasing the latch lever 303, the locking bolt 319 being disengaged from the rack 317. The casing 318 now slides down along the extension 308*a* of the handle until it reaches the abutment 308*c*, and likewise the control bar 311 with all parts connected with it is retracted by the spring 312 to its initial position. A mouthpiece formed as a cup-shaped insert is illustrated by Figures 15 and 16 and may be employed in different embodiments.

This device comprises a cylindrical casing 401 containing a microphone 402 of a conventional type. 403 designates a cup-shaped part hereinafter called "insert," the cylindrical portion 403*a* of which may be put into the upper open part 401*a* of the casing 401. The edges 3*b* of the insert 403 are enlarged to form a mouthpiece so shaped as to enclose the mouth of the user in a sound-tight manner.

The bottom of the insert 403 is formed by a sound-permeable diaphragm 404 being fixed in a retaining ring 405, with which it is secured to the lower edge of the insert 403. The diaphragm 404 is intended for preventing the breath of the speaker from penetrating into the microphone. The diaphragm 404 may be a thin film made of any plastic material.

A respiration valve 406 and an expiration valve 407 are arranged at the casing 401, while the insert has only openings 403*c* facing the respiration valve 406 and openings 403*d* facing the expiration valve 407.

In order to ensure that in putting the insert 403 into the casing 401 the openings 403*c* and 403*d* face the valves 406 and 407, pins 408 are provided on the inserts that are to engage slots 403*e* in the casing 401.

The insert 403 is so formed that it may be easily pushed into the casing 401. Other securing means, such as a "wrench" connection (not shown) may be provided.

This modification has the advantage that all parts of the mouthpiece touched by the user and his breath are combined to form a single element which is easily replaced and cleaned. In case the telephone apparatus is used by several persons successively, the used insert may be replaced without any loss of time, in the manner as when the same person has used an insert for a long conversation.

In the above described and illustrated embodiments the mouthpiece is arranged adjacent to the phone, partly mounted and partly hinged to it. However, it may also be useful to form the mouthpiece, such as it is shown in Figures 15 and 16, as a device to be held by the hand when used, while an earpiece of conventional type is used as a receiver. Thus the normal receiver phone with the microphone is retained in the telephone apparatus, and only for confidential or secret conversations is the mouthpiece of the invention, the microphone of which is connected to the telephone apparatus by means of a cord, brought to the mouth. In this case the phone is held at such a distance from the head that only the earpiece remains adjacent to the ear, while the mouthpiece, according to the invention, may be brought to the mouth, the normal mouthpiece of the phone, however, being kept aloof.

What is claimed is:

1. A device for use with a telephone handset comprising a mouthpiece for enclosing the mouth of the conversing person in a sound-proof fashion, said mouthpiece being in sound-transmitting relationship with the microphone of the telephone handset, said mouthpiece having a sound-damping air outlet for the air expired by the conversing person and an air inlet opening to permit the entry of air into said mouthpiece, an inlet valve at said inlet opening to close the latter during expiration of air by the conversing person and to permit the entry of air therethrough during the inspiration of air by the conversing person, an outlet valve in said mouthpiece disposed between said sound-damping air outlet and said air inlet opening and operative to prevent the flow of air into said mouthpiece through said outlet during inspiration of air by the conversing person, and a moisture-proof sound transmitting protective diaphragm interposed between the interior of said mouthpiece and the microphone.

2. A device according to claim 1; wherein said inlet and outlet valves are formed by resilient plate valve members.

3. A device according to claim 1; further comprising an exchangeable damping filter cartridge mounted within said air outlet.

4. A device according to claim 1; further comprising an exchangeable damping filter cartridge mounted within said air outlet and soaked with bactericidal compounds.

5. A device according to claim 1; wherein said air outlet includes an enlarged chamber opening outwardly to accommodate a sound damping filter cartridge, and a perforated cap removably enclosing said enlarged chamber to facilitate removal and replacement of a cartridge therein.

6. A device according to claim 1; wherein said protective diaphragm has a damp-proof coating thereon.

7. A device according to claim 1; further comprising a hygienic insert formed to fit into said mouthpiece and overlap the edges of the latter, said insert being made of sound permeable pulp soaked in bactericidal compounds.

8. A device according to claim 1; wherein said mouthpiece is integral with a hollow body, and further comprising means for mounting the mouthpiece in sound-transmitting relationship with the microphone including a hollow guide body in which said mouthpiece body slidably telescopes, means frictionally maintaining said mouthpiece body in adjusted position within said guide body, and means on said guide body for acoustically mounting the latter on the microphone portion of a telephone handset.

9. A device according to claim 1; wherein said mouthpiece includes a hollow body having a flaring mouth-engaging portion at one end, and further comprising means for mounting the mouthpiece on the microphone including a hollow guide body into which said mouthpiece body slidably telescopes, means frictionally maintaining the mouthpiece body in adjusted position within said guide body, a hollow extension at one side of said guide body, and means for detachably mounting said hollow extension on the microphone portion of a telephone handset.

10. A device according to claim 9; wherein the last mentioned means includes a rubber sleeve at the end of said hollow extension to engage tightly and adjustably over the microphone portion of a telephone handset.

11. A device according to claim 9; wherein the bottom of said hollow body of the mouthpiece is inclined in the direction toward said one side of the guide body, said hollow body of the mouthpiece having an aperture in the side thereof facing toward said extension on the guide body, and wherein said extension has a transverse partition therein and said protective diaphragm is arranged in said transverse partition.

12. A device according to claim 1; wherein the mouthpiece and the microphone are combined to form an independent unit arranged on the telephone, said unit being adjustable with regard to its distance from the earpiece, a hinge operated by the hand holding the telephone and forming distance adjusting means.

13. A device according to claim 1; wherein the mouthpiece and the microphone are combined to form an independent unit arranged on the telephone, said unit being adjustable with regard to its distance from the earpiece by means of a hinge operated by the hand holding the telephone, a cranked lever pivotally mounted on the telephone handle in a plane of the telephone handle and tiltable laterally with respect thereto, the microphone casing with the mouthpiece being pivotally mounted in the main plane of the telephone on the arm of the cranked lever opposite to the telephone handle, the other arm of said cranked lever being parallel to the telephone handle.

14. A device according to claim 1; wherein the mouthpiece and the microphone are combined to form an independent unit arranged on the telephone, said unit being adjustable, with regard to its distance from the earpiece, by means of a hinge operated by the hand holding the telephone, a cranked lever pivotally mounted on the telephone handle in a plane of the telephone handle and tiltable laterally with respect thereto, the microphone casing with the mouthpiece being pivotally mounted in the main plane of the telephone on one arm of said cranked lever opposite to the telephone handle, the other arm of the cranked lever being parallel to the telephone handle, lugs arranged on the supporting arm of the cranked lever adjacent to the telephone handle, said lugs forming abutments for limiting the lateral tilting movement of the cranked lever relative to the telephone handle.

15. A device according to claim 1; wherein the mouthpiece and the microphone are combined to form an independent unit arranged on the telephone, said unit being adjustable, with regard to its distance from the earpiece, by means of a hinge operated by the hand holding the telephone, a cranked lever pivotally mounted on the telephone handle in a plane of the telephone handle and tiltable laterally with respect thereto, the microphone casing with the mouthpiece being pivotally mounted in the main plane of the telephone on the one arm of said cranked lever opposite to the telephone handle, the other arm of the cranked lever being parallel to the telephone handle, the cranked lever being pivotally mounted about an axle in the main plane of the telephone and supported on a ring surrounding the telephone handle, said ring being movable about an axis perpendicular to the main plane of the telephone handle.

16. A device according to claim 1; wherein said mouthpiece is joined to a cup-shaped hollow body and a filter is disposed in said air outlet, and said mouthpiece, hollow body and filter are arranged on the same axis as the microphone, with a diaphragm corresponding in size to that of the microphone being disposed at the bottom of said cup-shaped hollow body parallel to the microphone diaphragm and including a small air chamber.

17. A device according to claim 16; further including mechanical means connecting said diaphragm at the bottom of said hollow body to the microphone diaphragm.

18. In a device for use with telephone apparatus for preventing other persons from listening to the local participant in a telephone conversation; said device comprising a microphone mouthpiece enclosing the mouth of the conversing person in a soundproof way, a sound damping air outlet provided on said mouthpiece for the air expired by the conversing person, the mouthpiece and the microphone of the telephone transmitter forming an independent unit arranged to be adjusted as to its distance and orientation with respect to the earpiece by the conversing person, a hand-actuated device for lifting the mouthpiece to the mouth of the conversing person, said lifting device comprising a lever linkage operative to provide a great lifting movement in response to a small movement of the hand operating the lifting device.

19. A device according to claim 18; wherein linkage system of the mouthpiece is constructed as a straight-path guide system including a pair of shorter guide rods and a pair of longer guide rods and a connecting bar, an operating handle for the lifting device, said operating handle and the linkage lever forming an isoceles-triangle lever system.

20. A device according to claim 18; wherein linkage system of the mouthpiece is constructed as a straight-path guide system including a pair of shorter guide rods and a pair of longer guide rods and a connecting bar, an operating handle for the lifting device, said operating handle and the linkage lever forming an isoceles-triangle lever system, an actuating latch lever being hinged to the handle of the telephone receiver, the free arm of said latch lever being in engagement with the shorter guide rods of the lever linkage system near the pivot of the said guide rod, a pair of longer pivoted guide rods provided on the handle, a bar connected to the ends of the said guide rods, the mouthpiece being hinged in the straight guided point on the said bar.

21. A device for use with telephone apparatus for preventing other persons from listening to the local participant in a telephone conversation; said device comprising a microphone mouthpiece enclosing the mouth of the conversing person in a soundproof way, a sound damping outlet provided on the said mouthpiece for the air expired by the conversing person, the mouthpiece and the microphone of the telephone forming an independent unit arranged to be adjusted as to its distance and orientation with respect to the earpiece by the conversing person, a hand-actuated device for lifting the mouthpiece to the mouth of the conversing person, an actuating latch lever hinged to the handle of the telephone receiver, the lifting device including in a ratchet-rack arrangement, a retracting spring and a click member being provided for said ratchet-rack arrangement, a lever linkage forming a movement magnifying transmission for interconnecting the latch lever hinged to the handle and the click member of the ratchet rack arrangement.

22. A device according to claim 21; further comprising a transmission linkage interconnecting the actuating latch lever with a control bar, a retracting spring provided in an extension of the handle of the telephone receiver and retracting the said control bar, a click member operated by said control bar and being under the force of a latch spring, said click member being in cooperation with the rack, said rack being slidably mounted on the extension of the handle of the telephone receiver and carrying forked arms provided with hinges for the mouthpiece.

23. A device according to claim 21; further comprising a transmission linkage interconnecting the actuating latch lever with a control bar, a retracting spring provided in an extension of the handle of the telephone receiver and retracting said control bar, a click member operated by said control bar and being under the force of a latch spring, said click member being in cooperation with the rack, said rack being slidably mounted on the extension of the handle of the telephone receiver and carrying forked arms provided with hinges for the mouthpiece.

24. A device according to claim 18; wherein the mouthpiece is hinged to adjustable straight guided supports, and abutments are provided for preventing the hinged mouthpiece from being tilted in an undesired great amount.

25. A device according to claim 18; wherein the earpiece is mounted on the handle of the telephone receiver by means of a universal joint.

26. In a device according to claim 18; wherein the earpiece is mounted on the handle of the telephone receiver by means of a short helical spring.

27. A device according to claim 1; wherein the mouthpiece is formed by a cup-shaped insert, apertures being provided in the sidewalls of said insert, said apertures being in cooperation with the air inlet valve and the valve separating the mouthpiece from the sound damping air outlet, said valves being mounted on an outer cupshaped casing containing the microphone of the telephone transmitter.

28. A device according to claim 1; wherein the mouthpiece is formed by a cup-shaped insert, apertures being provided in the sidewall of said insert, said apertures being in cooperation with the air inlet valve and the valve separating the mouthpiece from the sound damping air outlet, said valves being mounted on an outer cup-shaped casing containing the microphone of the telephone transmitter, the moisture-proof sound transmitting diaphragm forming the bottom member of said cup-shaped insert.

29. A device according to claim 1; wherein the mouthpiece is composed of transparent material.

30. A device according to claim 1; wherein the mouth-piece is composed of transparent plastic.

31. A device according to claim 1; wherein a standard telephone receiver is provided additionally, the device being provided as a unit composed of mouth-piece and transmitter-microphone and connected to the telephone apparatus by means of a connecting cable, said device being adapted to be taken to the mouth of the conversing person, while using the earpiece of the standard telephone receiver.

References Cited in the file of this patent

UNITED STATES PATENTS

| | | |
|---|---|---|
| 1,508,310 | Van Houte | Sept. 9, 1924 |
| 2,398,076 | Bulbulian | Apr. 9, 1946 |
| 2,465,985 | Veneklasen | Mar. 29, 1949 |
| 2,478,783 | Scher | Aug. 9, 1949 |

FOREIGN PATENTS

| | | |
|---|---|---|
| 133,841 | Austria | Dec. 15, 1932 |